G. E. WHITAKER.
Wagon-Top.
No. 200,010. Patented Feb. 5, 1878.
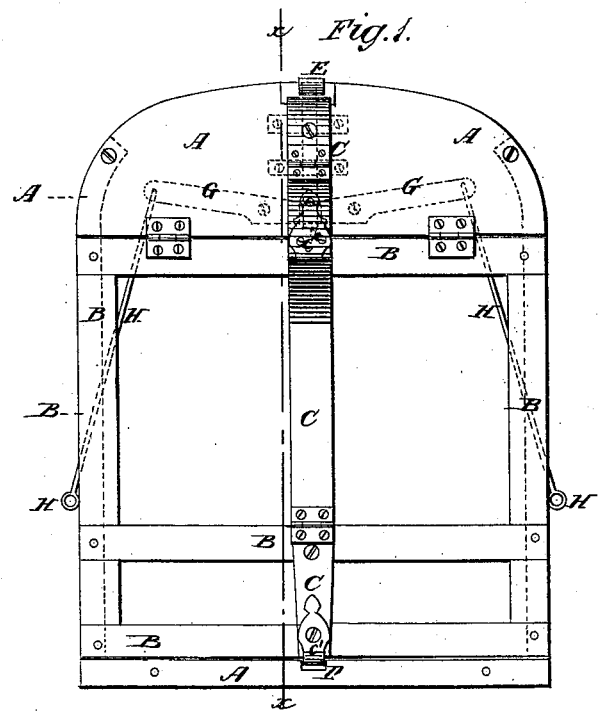
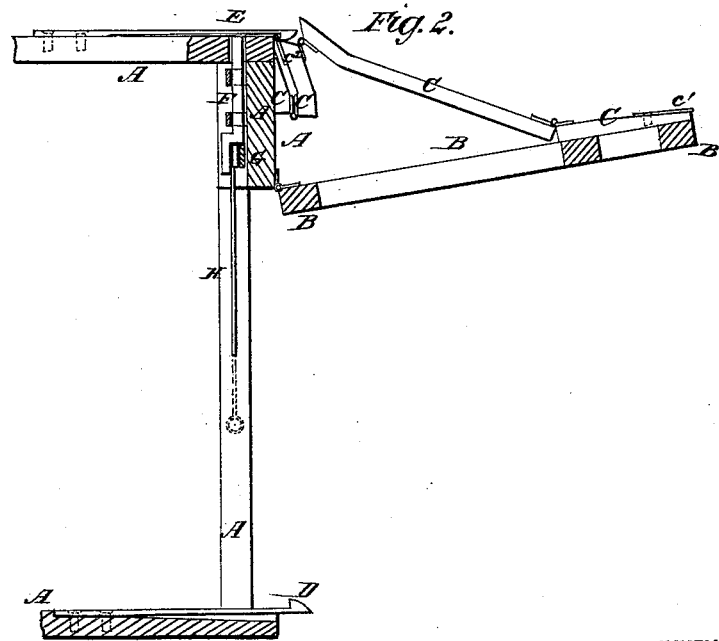
WITNESSES:
Francis McArdle
J. H. Scarborough
INVENTOR:
G. E. Whitaker.
BY Munn & Co
ATTORNEYS.

UNITED STATES PATENT OFFICE.

GEORGE E. WHITAKER, OF HUDSON, MASSACHUSETTS.

IMPROVEMENT IN WAGON-TOPS.

Specification forming part of Letters Patent No. 200,010, dated February 5, 1878; application filed August 18, 1877.

*To all whom it may concern:*

Be it known that I, GEORGE EMERSON WHITAKER, of Hudson, in the county of Middlesex and State of Massachusetts, have invented a new and useful Improvement in Butchers' Carts and other Covered Wagons, of which the following is a specification:

Figure 1 is a rear view of the body of a butcher's cart to which my improvement has been applied. Fig. 2 is a vertical longitudinal section of the rear part of the same, taken through the line $x\ x$, Fig. 1.

Similar letters of reference indicate corresponding parts.

The object of this invention is to furnish covered carts or wagons which shall be so constructed as to prevent loss from the contents dropping or jarring out, or being removed by thieves while moving slowly; to protect the contents from dust, flies, insects, &c.; to protect the driver from sun and rain while standing for the purpose of trading or other purpose; to give convenient access to the interior, and which shall be simple in construction, easily operated, and not liable to get out of order.

The invention consists in the combination of the bar, made in parts or sections, hinged to each other, and the spring-catches or other fastenings, with the hinged frame and the body of a cart or wagon; and in the combination of the push-rod, the levers, and the wires or cords with the upper spring-catch, the body of a cart or wagon, the hinged frame, and the sectional hinged bar, as hereinafter fully described.

A represents the body of a cart or wagon. B represents a frame, which may be the rear end or a portion of the side of the body A, and which is hinged at its upper edge to said body A. C is a bar, which is made in four parts or sections, hinged to each other in such a way that they may be folded together, as shown in Fig. 2. The upper section of the bar C is attached to the upper part of the body A, and the lower section is attached to the lower part of the frame B. The two intermediate sections of the bar C meet at such an angle that they will fold together automatically as the lower end of the frame is raised.

To the lower end of the bar C or frame B is attached a plate, $c^1$, to catch upon a spring-catch, D, attached to the bottom of the body A. To the lower part of the upper intermediate section of the bar C is attached a plate, $c^2$, which, when the frame B is raised, catches upon a spring-catch, E, attached to the top of the body A.

The spring-catch E is raised to allow the frame B to be lowered by a push-rod, F, which passes up through the top of the body A, and the lower end of which rests on the inner ends of the two levers G. The levers G are pivoted to the body A, and to their outer ends are attached the upper ends of two wires or cords, H, which pass down through holes formed in, or keepers attached to, the body A, into such a position that their lower ends may be conveniently reached and pulled to raise the catch E, and allow the frame B to drop, when it fastens itself.

The frame B is designed to be covered with canvas or other suitable material.

Other fastenings may be used in place of the spring-catches D E, if desired.

Having thus described my invention, I claim as new and desire to secure by Letters Patent—

1. The combination of the bar C, made in parts or sections hinged to each other, and the spring-catches D E, or other fastenings, with the hinged frame B and the body A of a cart or wagon, substantially as herein shown and described.

2. The combination of the push-rod F, the levers G, and the wires or cords H with the spring-catch E, the body A, the hinged frame B, and the sectional hinged bar C, substantially as herein shown and described.

GEORGE EMERSON WHITAKER.

Witnesses:
    JAMES T. JOSLIN,
    RUFUS W. WILKINS.